United States Patent [19]

Lewis

[11] 4,411,203

[45] Oct. 25, 1983

[54] PROCESS FOR UTILIZING LOW CALORIFIC VALUE OFF-GASES AND SIMULTANEOUS DEODORIZATION THEREOF

[75] Inventor: Frederick M. Lewis, Mountain View, Calif.

[73] Assignee: Sterling Drug Inc., New York, N.Y.

[21] Appl. No.: 386,433

[22] Filed: Jun. 8, 1982

[51] Int. Cl.³ ............................................. F23J 3/00
[52] U.S. Cl. .................................. 110/341; 110/215; 110/225; 110/238; 55/84
[58] Field of Search ............... 110/235, 247, 225, 215, 110/216, 211, 238, 341; 55/84

[56] References Cited

U.S. PATENT DOCUMENTS

| | | | |
|---|---|---|---|
| 1,291,175 | 1/1919 | Sargent et al. | 110/215 |
| 2,181,190 | 9/1936 | Lewers | 110/225 |
| 2,283,641 | 5/1942 | Martin et al. | 110/225 |
| 2,286,309 | 5/1942 | Rowen | 110/225 |
| 2,317,941 | 3/1943 | Rowen | 110/225 |
| 3,359,200 | 12/1967 | Gitchel et al. | 210/63 |
| 3,382,649 | 10/1966 | Richmond | 55/84 |
| 3,656,441 | 4/1972 | Grey et al. | 110/215 |
| 3,697,417 | 10/1972 | Teletzke et al. | |
| 3,777,680 | 12/1973 | Eck | 110/225 |
| 4,215,637 | 8/1980 | Lombana | 110/225 |
| 4,223,614 | 9/1980 | Barkhuus et al. | 110/215 |

OTHER PUBLICATIONS

Thermal Sludge Conditioning Report: Grand Haven, Michigan (1975).
W. M. Copa, Odor Control for Thermal Sludge Conditioning Units, 1974.
Henry, J. G. and R. Gehr, Odor Control: An Operator's Handbook, Journal WPCF 52 (10) 2523–2537 (1980).

*Primary Examiner*—Henry C. Yuen
*Attorney, Agent, or Firm*—Alfred D. Lobo; Allen H. Erickson; B. Woodrow Wyatt

[57] ABSTRACT

A process is disclosed in which any off-gas generated in a wastewater treatment plant, which off-gas has a low calorific (or BTU) value about one-tenth of that of natural gas, and usually even less, may be profitably burned in a multiple hearth furnace if the off-gas is first wet-scrubbed to a temperature below about 90° F., then pre-heated by passing it through the center shaft of a multiple hearth furnace, before the pre-heated gas is burned. Such cooling of the off-gas by wet-scrubbing has the effect of lowering the moisture content of the wet-scrubbed gas sufficiently so that it may be advantageously pre-heated in the center shaft of the furnace and recycled to the hearths to assist in the combustion of sludge. In addition to providing desirable savings in auxiliary fuel usage, wet-scrubbed off-gas is unexpectedly cleansed of a sufficient amount of its corrosive components so as to permit ducting the wet-scrubbed gas in mild steel or cast iron equipment. Further, burning an odorous gas conveniently deodorizes it. The greater opening efficiency thus achieved provides more economical operation of a wastewater treatment facility. The process is most profitably utilized with decant tank off-gas ("DTO") which is generated in an amount about equal to the normal cooling gas capacity ("CG") of the furnace's center shaft, and which DTO is about equal to the volume of combustion air ("CA") which would be required to burn the sludge.

8 Claims, 1 Drawing Figure

PROCESS FOR UTILIZING LOW CALORIFIC VALUE OFF-GASES AND SIMULTANEOUS DEODORIZATION THEREOF

BACKGROUND OF THE INVENTION

This invention is related to waste-water treatment, and more particularly to the disposal of paper mill sludge off-gases and sewage sludge off-gases. It is most useful in the disposal by incineration of (i) the sludge, (ii) off-gases generated incident to the treatment of the sludge, and (iii) off-gases generated from trickling filters and the like, so that heat produced in the incinerator may be used to generate steam. This process is equally applicable to 'non-autogenous' sewage sludge, so referred to because it does not generate enough heat upon burning to sustain combustion without the addition of heat from an external source ("auxiliary fuel"), and to 'autogenous' sewage sludge.

As those skilled in the art will appreciate, the energy balance around a sewage disposal facility is of critical significance and determines the economics of its operation. Failure to recover energy generated within an incinerator for the sludge in a non-autogenous system must be paid for by supplying external fuel. Thus, a critical economic appraisal of the energy balance becomes keyed (a) to maintaining the temperature of a gas as high as possible if it is to be used for combustion, so as not to heat cold gas in the combustion zone, irrespective of the calorific (or BTU) value of the gas, and (b) to utilizing high calorific value gases for combustion rather than low calorific value gases, because the size of the incinerator defines its volumetric flow rate limitation.

'Wet-scrubbing' is as basic a "unit operation" in the chemical engineering art as 'heat exchange', 'filtration', 'distillation', 'extraction', and several others. The first step in the design of a processing plant is to consider which one or more of the several unit operations would best serve the overall purpose of the plant to be built; the second step is to consider how and where each chosen unit operation is to be used; and, the third step is to consider the details of designing the equipment to perform each chosen operation, consistent with the best engineering practices. As will be readily recognized by those skilled in the art, once a choice of unit operations is made, and specifications are provided as to what each operation must accomplish, and how, a competent design falls into place, albeit with deceptive ease. The cost is usually more than one expects it to be. This invention is directed to the unobvious choice of plural unit operations in a sewage sludge wast disposal plant, and the unique combination of steps incident to their implementation, which steps result in a process for solving a particular and peculiar problem in a suprising effective manner.

Referring again to 'wet-scrubbing', it will be recognized that this is a commonplace unit operation in the treatment of 'stack gas', namely, effluent gases from a sewage sludge incinerator. Wet-scrubbers are conventionally used to decrease the amount of gas-borne pollutants discharged into the atmosphere. In a wastewater treatment plant, water for wet-scrubbing may be effluent water which has been treated in the plant ('treated effluent'). The water may also contain a small amount of caustic soda (NaOH), sufficient to neutralize or otherwise react with components of the off-gases, usually less than about 5 percent by weight (% by wt) of the water. In some wet-scrubbers, the water may contain a small amount of potassium permanganate ($KMnO_4$), usually less than about 5% by wt of the water. In still other wet-scrubbers, the water may contain powdered activated carbon, in amount less than about 1% by wt, or activated sludge, preferably in an amount in the range from about 50 parts per million (ppm) to about 5000 ppm, or mixtures of the foregoing. By 'wet-scrubbing' I refer, in this specification, to all the foregoing wet-scrubbing applications, and 'water' for wet-scrubbing refers to water which may contain either NaOH or $KMnO_4$ in solution, or powdered activated carbon, or activated sludge, or any combination of the foregoing.

Numerous engineeringly sophisticated wet-scrubbing devices have been used to "clean up" stack gas economically. The purpose and effect of all such devices is to remove a major portion of the fly ash, as much other particulate matter as they can, and such water-soluble compounds from the stack gas as are readily soluble. Necessarily incidental to this purpose, because cool water is generally the liquid phase in the wet-scrubbing device, the temperature of the stack gas is lowered to a temperature in the range from about 100° F. to about 200° F. while it becomes saturated, that is, has 100% relative humidity. Since providing cool water adversely affects the economics of the plant, the temperature of the stack gas is maintained no lower than is necessary to discharge a visually acceptable plume.

Despite such wet-scrubbing, the concentration of particulate matter in the stack gas is still relatively high, and the relatively low temperature of the stack gas deleteriously affects the operation of all equipment in contact with it. To combat the problem, U.S. Pat. No. 3,382,649 (the '649 patent) teaches increasing the temperature of the wet-scrubbed stack gas, and various schemes are provided to do so. Heating of the wet stack gas, as disclosed in the '649 patent, is unrelated to the overall demands of the incinerator because of the type of sludge it is burning, the sole purpose being to minimize the corrosive effect of stack gas and negate its proclivity to encrust the equipment with solid matter.

However, recognizing that it is desirable to provide preheated air to the combustion zone, the '649 patent also teaches cooling the rotatable central shaft and connected rabbling arms of a multiple hearth furnace (also referred to herein as "incinerator" or simply "furnace"), with combustion air. As is well-known in the art, and described in U.S. Pat. Nos. 2,181,190, 2,286,309, 2,317,941, and 4,215,637 inter alia, the teachings of which, as to the construction of multiple hearth furnaces, are incorporated by reference thereto, the central shaft and interconnected rabbling arms are in open flow communication.

Shaft-cooling gas ("CG") to cool the shaft and rabbling arms is provided by a blower which blows cool air upwards through the shaft. This cool air is heated in the shaft, thus keeping the shaft relatively cool in the hot furnace, and the air leaves the top of the shaft as shaft-heated air at a temperature in the range from about 250° F. to about 600° F., to be recycled as combustion air into the multiple hearth furnace. The flow of cool air required to keep the shaft cool during operation is referred to as the "normal cooling air capacity" of the shaft. A minimum air velocity through the center shaft must be maintained in order to assure satisfactory heat transfer, while maximum air velocity is determined by the pressure drop through the shaft. Therefore flow of gas through the shaft has definite limits.

Off-gases, other than the stack gas, generated in a "wet-oxidation" process, have also been wet-scrubbed for several purposes, including (i) decreasing their temperature so as to provide a visually acceptable plume, (ii) decreasing the concentration of water-soluble ingredients thought to be responsible for the malodorous characteristic of sludge treatment off-gases (hereafter simply "odorous" off-gases to connote their characteristically unpleasant smell), and (iii) decreasing the concentration of ingredients thought to be at least in part responsible for the corrosivity of the off-gases.

When sludge treatment includes air injection to achieve some oxidation, the process is called "wet oxidation", and is described in greater detail in U.S. Pat. Nos. 3,697,417 and 3,359,200, to Teletzke et al and Gitchel et al respectively, the disclosures of which as to sludge treatment are incorporated by reference herein as if fully set forth. Such off-gases include those separated and discharged from the reactor, or a separator vessel, or the decant tank of a waste-water treatment plant, and are collectively referred to herein as "sewage sludge off-gas". Any such off-gas discharged, and particularly decant tank off-gas ("DTO") is typically warm (100°-200° F.), and usually water-saturated and odorous.

The decant tank is so termed because cooled sludge is allowed to thicken and settle in the tank and supernatant liquid is decanted. This decant tank is also referred to as a 'thickening tank' (as in Teletzke et al, supra) or an 'oxidized sludge tank' (as in Gitchel et al). As disclosed in the '417 patent, DTO is now wet-scrubbed and discharged to the atmosphere.

For example, is a particular sewage plant built in Hollywood, Florida, decant tank off-gas ("DTO") which had been diluted with fresh air, was wet-scrubbed with cooling water and discharged to the atmosphere. The odor was unacceptable. When wet-scrubbed, its temperature dropped less than 10° F., but sufficiently to provide a better plume. However, the $CO_2$, CO, $CH_4$ and total hydrocarbon content ("THC") were reduced insignificantly, and there was no improvement in the odor of the discharge.

In another sewage plant built in Minneapolis-St. Paul, MN, DTO was wet-scrubbed with water which cooled the DTO from about 120° F. to about 70° F. Again, the odor was unacceptable. This cooled wet-scrubbed gas was not burned because it was deemed uneconomical to do so.

Since it was known that combustion of off-gases improved their odor, off-gases have been burned directly in the furnace without wet-scrubbing, primarily for odor control, for example at a plant built at Grand Haven, MI, and described in a brochure entitled "Thermal Sludge Conditioning Report: Grand Haven, Michigan" and distributed by that city. This form of odor control was effected in accordance with the suggestion of a paper entitled "Odor Control for Thermal Sludge Conditioning Units" delivered by William M. Copa in 1974.

In another article, titled "Odor Control: an operator's guide" by Henry, J. G. and Gehr, R., *Journal WPCF*, Vol 52, No. 10, pgs 2523–2537, at pg 2533, October 1980, "direct combustion" is suggested for high odor concentration and small volume of combustible gases with at least 4,000 $KJ/m^3$ (131 $BTU/ft^3$) heating value, not typical of a sludge off-gas. For comparison, it is noted that the heating value of natural gas is about 1000 $BTU/ft^3$. No suggestion is made that the odorous gas be wet-scrubbed before it is burned, for any reason, in either reference.

Direct combustion has also been used, after the DTO has been wet scrubbed to saturate it, in an autogenous furnace to avoid its overheating. In an autogenous furnace burning off-gases, predominantly DTO was directly burned in the combustion zone without wet-scrubbing, for example, at the Kalamazoo, MI Wastewater Treatement plant. In another autogenous furnace built in Cedar Rapids, IA., odorous off-gases, predominantly DTO, were burned after wet-scrubbing because the moisture in the off-gases helped prevent overheating of the furnace, though an additional benefit was the decrease of corrosivity of the off-gases due to scrubbing.

In no instance was a low heating value off-gas, that is, having a heating value less than about 100 $BTU/ft^3$, first wet/scrubbed to a temperature below about 90° F., and then burned in an incinerator with the specific purpose of recovering such little heating value as the off-gas may have. As is evident from the foregoing, there was no reason to do so.

SUMMARY OF THE INVENTION

Despite an initial presentiment against cooling any one or more of several odorous sludge off-gases, for example decant tank off-gas ("DTO"), which is to be burned, it has been discovered that, though wet-scrubbing DTO cools it to within the temperature range of from about 50° F. to about 90° F., it also limits its moisture content sufficiently to permit such a low calorific (or BTU) value gas to be burned advantageously in a multiple hearth furnace. Because of the relatively low temperature of such wet-scrubbed odorous gas, it is used as a heat transfer medium ("center shaft cooling gas", hereafter "CG" for brevity) when it is passed through an axial passage in the furnace's center shaft and interconnected hollow rabbling arms, before the gas is ducted to the furnace's hearths to assist in combustion of sewage sludge.

It has further been discovered that an odorous off-gas may be wet-scrubbed to counteract the corrosivity of such gas, at least to a sufficient extent to allow use of mild carbon steel and/or cast iron equipment for ducting the gas.

It has still further been discovered that wet-scrubbing an odorous off-gas with cool water removes certain of its difficultly identifiable and continually changing corrosive ingredients which exhibit unexpectedly high corrosivity due to what appears to be a deleteriously synergistic effect of the ingredients and water vapor (moisture) in the gas.

The process of this invention most preferably utilizes essentially all the DTO produced in a sewage sludge disposal facility, which DTO replaces a major portion by volume, if not all, of the normal cooling air capacity of the center shaft which air conventionally cools the shaft and rabbling arms, and the DTO is thus preheated. The combustion of this preheated DTO in a multiple hearth furnace provides a significant and surprisingly financial benefit in the overall heat balance of a sewage disposal facility whether the sewage burns autogenously or not.

BRIEF DESCRIPTION OF THE DRAWINGS

The foregoing and other objects and advantages of my invention will appear more fully from the following description, made in connection with the accompanying drawing of a preferred embodiment of the invention, wherein.

DETAILED DESCRIPTION OF PREFERRED EMBODIMENTS

Figure 1:
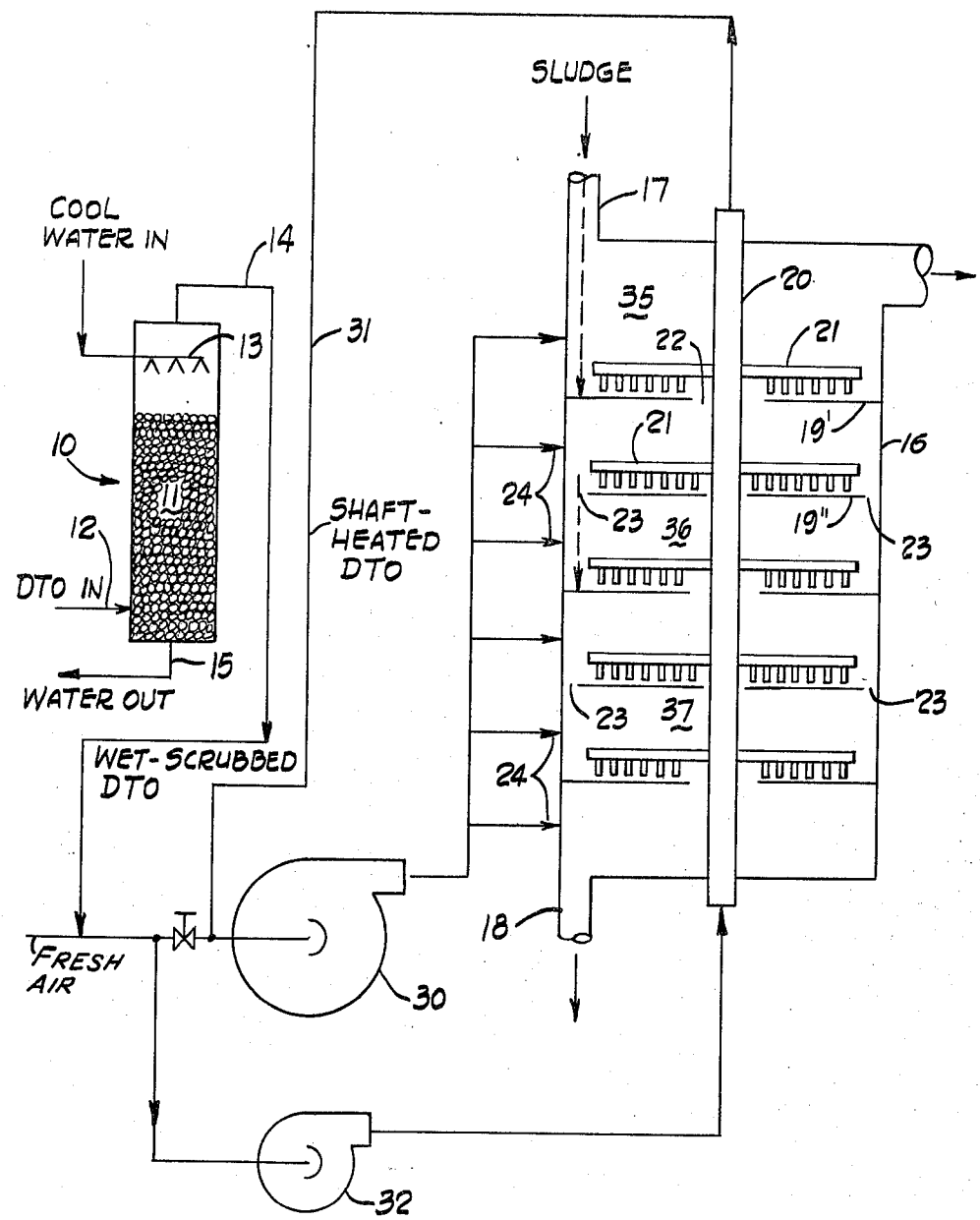
FIG. 1 is a schematic representation of a portion of a wastewater treatment plant in which decant tank off-gas ("DTO") is wet-scrubbed in a cool water scrubber, then passed through the central shaft of a multiple hearth furnace before the DTO, now preheated, is burned in the furnace.

At many wastewater treatment plants sludge is thermally conditioned to make it dewaterable. In this process the sludge is treated at a pressure in the range from about 200–600 psig, and a temperature in the range from about 300° F. to about 425° F. for a period in the range from about 5 minutes to about 1 hour. In addition, air may or may not be injected to achieve up to 15 percent oxidation of the Chemical Oxygen Demand (COD).

The sludge is discharged typcially at 130°–220° F. through a pressure control valve into a decant tank, where the suspended solids settle and the water phase overflows. The off-gases may be separated and discharged from the reactor, or a separator vessel, or the decant tank, and any or all of these sludge off-gases, and particularly sewage sludge off-gases, may be used in the process of this invention.

Details of known wet-oxidation processes are provided in the Teletzke et al and Getchel et al patents referred to hereinbefore. Characteristic of such an off-gas is its low calorific (or BTU) value, typically in the range from about 1 to about 100 BTU/ft$^3$, and a composition comprising less than 600 ppm, and typically less than about 400 ppm of CH$_4$, and less than about 6000 ppm of other hydrocarbons than methane (total hydrocarbon content "THC", less methane). The description hereafter will refer to the treatment of sewage sludge particularly to the situation when decant tank off-gas ("DTO") will be the principal sewage sludge off-gas, sometimes complemented with other odorous off-gases in the plant, used in the process of this invention.

Decant tanks are typically supplied with a fresh air opening so that as odorous DTO is evacuated to the sludge combustion furnace for deodorization, it is replaced by fresh air. The DTO is continually diluted in the headspace of the decant tank by incoming fresh air, though such dilution is optional. The quantity of incoming air is typically 0.5-4 times the quantity of DTO. The resulting DTO, diluted with air, is generally at a temperature of 100°–180° F. In this specification, the term DTO is used to refer to all the gas from the decant tank, whether the gas is diluted with fresh air or not.

At a typical wastewater treatment facility the DTO analyses (without dilution and after dilution with air), set forth hereinbelow in Table I, were as follows:

TABLE I

| Gaseous component of DTO | No dilution | After Dilution |
|---|---|---|
| Carbon dioxide (CO$_2$), % | 15.4 | 4.2 |
| Oxygen (O$_2$), % | 1.5 | 15.7 |
| Nitrogen (N$_2$), % | 79.0 | 78.7 |
| Carbon monoxide (CO), % | 0.3 | 0.1 |
| Methane (CH$_4$), ppm | 320 | 89 |
| THC less CH$_4$, ppm | 8700 | 2374 |

DTO having a composition similar to that identified hereinabove is corrosive to carbon steel because of its (a) moisture content (entrained and saturation), (b) carbon dioxide content, and (c) organic contant (aldehydes, ketones, etc). The halide, sulfate, sulfide and nitrate content of the DTO is insignificant, in terms of corrosion potential. The concentrations of these components is usually below or near the detectable limit of usual analytical methods. The total hydrocarbon content (THC) typcially consists of about two-thirds (2/3) aldehydes with the remainder being mostly organic acids, ketones, alkanes and alkenes. The heating value of the gas is much too low to suggest its use as a fuel, and does not exceed 300 BTU/ft$^3$ even if diluent fresh air volume (in those cases when air is allowed to enter the decant tank) is ignored.

Water-scrubbing of the Hollywood, FL, DTO which entered the scrubber at 140° F. and left it at 129° F. resulted in the following scrubber effluent analyses, set forth in Table II hereinbelow:

TABLE II

| Gaseous component of DTO | Day 1 | Day 2 | Mean |
|---|---|---|---|
| Carbon dioxide (CO$_2$), % | 5.5 | 5.3 | 5.4 |
| Oxygen (O$_2$), % | 14.3 | 14.4 | 14.4 |
| Nitrogen (N$_2$), % | 81.7 | 80.2 | 80.9 |
| Carbon monoxide (CO), % | 0.2 | 0.1 | 0.15 |
| Methane (CH$_4$), ppm | 113 | 121 | 117 |
| THC less CH$_4$, ppm | 1723 | 3018 | 2371 |

It is evident that at this temperature, water scrubbing did not significantly reduced the CO$_2$, CO, CH$_4$ or THC content of the DTO. Since the hydrocarbon content is essentially unaffected one cannot expect any decrease in corrosivity of the DTO. Furthermore, the gas was not significantly cooled (about 5°-10° F.) to affect the saturation moisture. Assuming this gas is to be burned, it is also evident that scrubbing under these conditions, and particularly where the scrubber effluent is at any temperature above about 90° F., results in so much retained moisture that there is a net energy loss for burning the gas. In other words, the heating value of DTO is insufficient to raise the temperature of its retained moisture to the temperature of the incinerator gas outlet.

Cooling the gas further to, say 70° F., condenses moisture and thus decreases the moisture content of the gas so much that it quiet unobviously converts the "not loss" heat balance, on DTO to the incinerator, to a "net gain". It also reduces the corrosivity of the DTO. It will now be apparent that where DTO is burned solely for reducing its odor, the cost of burning it with a high moisture content is uneconomical in an incinerator burning non-autogenous sewage sludge. Therefore this invention will be found to be most applicable to both autogenous and non-autogenous sewage sludge systems after the DTO's moisture content is lowered by cooling sufficiently to provide a net gain.

Referring now to FIG. 1 of the drawing, there is schematically illustrated a portion of a sewage plant in which DTO, optionally diluted with fresh air, enters a scrubber 10 packed with any suitable packing material 11. The DTO enters near the bottom as indicated by the legend "DTO IN", through inlet pipe 12, and flows upwards through the packing, countercurrently, to cool water sprayed on the top of the packing through spray nozzles 13. The cooling water temperature is necessarily less than 90° F. and is preferably as cold as possible without freezing, so that wet-scrubbed DTO, indicated by the legend "WET SCRUBBED DTO", leaving through effluent pipe 14, is always at a temperature which is no higher than about 90° F., and preferably no higher than 70° F.

The water flowing out the scrubber includes readily soluble DTO components, particularly a significant proportion of corrosive ingredients in the DTO, and leaves through outlet pipe 15. The remaining corrosive ingredients in the DTO are present in a concentration low enough to allow the use of mild steel and cast iron ducting and equipment.

In wastewater treatment plants to which this invention is directed, the quantity of DTO is important when related to the CG capacity of the shaft, and the total combustion air (TCA) requirement. When DTO>CG, a portion of the scrubbed decant tank gas may be used directly as combustion air after mixing with the heated decant tank gas. When DTO<CG, it may be necessary to mix some fresh air with the DTO prior to passing through the incinerator shaft to achieve sufficient cooling. But, at all times, the DTO in the CG comprises a major proportion by volume of the normal cooling air capacity of the shaft. In the most desirable mode having highly favorable economics of operation, the volumes of (i) DTO available from the decant tank, (ii) CG required to cool the shaft, and (iii) combustion air (CA) to burn the sludge in the furnace, are approximately equal.

Any type of water scrubber, whether a packed tower, cyclone, bubble-cap scrubber, or other type may be used, as long as the actual gas-liquid contact time is at least 1.0 sec, and the wet-scrubbed DTO temperature is at or below 90° F., and preferably below 70° F. Contact time need never exceed 3 seconds. Packed towers having 3–10 feet of packing may be operated for example at Liquid:Gas ratios (on a weight basis) in the range from about 2 to 3, producing a pressure drop of about 0.25 inches water per foot of packing. Either potable water or plant effluent, for example, may be used in the scrubber.

Referring further to FIG. 1 of the drawing, there is shown a multiple hearth furnace indicated generally by reference numeral 16 which comprises a substantially vertically disposed, refractory lined cylindrical vessel having an inlet 17 for sludge at its upper end and an outlet 18 for ash at its lower end. A plurality of hearths 19' and 19" are located within the vessel perpendicular to its axis, spaced apart from one another.

A hollow center shaft 20 is rotatably disposed longitudinally axially in the furnace, and a plurality of hollow rabble arms 21, which are internally in open flow communication with the center shaft, are affixed to the center column parallel to the hearths 19' and 19". Drive means (not shown) is coupled to the lower end of the center shaft 20 to cause the center column to rotate so that the rabble arms 21 urge material to travel across the hearths 19' and 19". The hearths are constructed so that material flows downward through the furnace in a generally serpentine path. In particular, the uppermost hearth 19' is affixed to the inner walls of the furnace leaving a relatively large diameter central port 22, while the next lower hearth is closely spaced relative to the center shaft and has a plurality of ports 23 formed around the hearth's periphery. Successively alternative lower hearths are the same construction as the first two hearths so as to obtain the desired downward flow-path of burning sludge.

A plurality of nozzles 24 are connected through the side of the furnace 16 in selected hearth spaces. The nozzles 24 are supplied with preheated (shaft-heated) DTO which is forced into the furnace by blower 30 coupled in gas flow communication with the center shaft through pipeline 31 carrying shaft-heated DTO. Additionally, burners coupled to sources of pressurized air and fuel, not shown, may be provided to supply external auxiliary fuel to the furnace, if desired, as is conventionally done.

For the purpose of this description the furnace 16 should be understood to include an upper zone 35 wherein sludge is dried, and a middle zone 36 wherein the dry sludge is charred and volatiles are burned. A lower zone 37 is optionally disposed below the middle zone 36 for burning fixed carbon. Each of these zones comprises one or more hearth spaces. Although each of the zones is illustrated to encompass a particular number of hearth spaces, various operating conditions can dictate the use of different numbers of hearth spaces for a particular zone.

It should be understood that the hollow center shaft 20 and the rabble arms 21 are conventionally used to preheat combustion air, but are specifically used herein to conduct DTO. Wet-scrubbed DTO is forced through the center shaft and rabble arms by another blower 32 which is coupled in gas flow communication with the effluent pipe 14 and connected to the lower end of the center shaft 20. Thereby wet-scrubbed cool DTO can be blown into the lower end of the center shaft 20 while it rotates. The DTO travels upwardly through the center shaft and the rabble arms to exit from the upper end of the center shaft. Depending upon the particular mode of operation desired for the furnace, either one or both of the blowers 31 and 32 may be employed.

The foregoing details as to the construction of a multiple hearth furnace and cooling of its center shaft, are well known and are duly set forth herein only to the extent it might be deemed necessary to focus the attention of one skilled in the art upon the structural features essential to the process of this invention, namely, a central shaft and rabble arms capable of preheating DTO before it is directed to a blower means to supply the DTO to one or more burners on hearths of the furnace.

Typically, the process of this invention may be used to assist in the incineration of any dewatered sludge burned in a multiple hearth furnace, including a sludge which is not thermally conditioned in which the solids content is in the range from about 15% to about 60% by weight (the remaining being moisture), but is most preferably used with a dewatered sludge having a total solids content in the range from about 20% to about 60%, and most preferably in the range from about 35% to about 60% by weight; combustible material (combustibles) in the range from about 40% to about 85% and a heating value in excess of about 7500 BTU/lb combustibles. Stated differently, each pound of wet sludge should have from about 0.06 lb to about 0.51 lb of combustibles, the higher the better.

For efficient incineration of the sludge, the amount of combustion air required is typically about 175% of the stoichiometric requirement, based on combustibles contained in the sludge. To minimize auxiliary fuel consumption and maximize energy recovery (steam generation), shaft cooling air preheated to about 450° F. in the shaft, is used in the furnace as sludge combustion air, thus avoiding discharging heated air directly to the atmosphere.

Even if the prior art process, where non-wet-scrubbed DTO is directly burned in the furnace to deodorize the DTO, was modified to substitute this DTO for shaft cooling air, thus cooling the center shaft, there still results a loss of heat, which loss is suffered to deodorize the DTO. This loss is caused by having to raise the temperature of the non-wet-scrubbed DTO from a shaft exit temperature in the range from about 250° F. to about 600° F., to a deodorizing temperature in the range from about 1300° F. to about 1600° F. When the sludge burned highly autogenous, this heat loss due to injecting wet DTO (directly from the decant tank), helps prevent overheating the furnace. When the sludge is either non-autogenous, or, autogenous only when preheated shaft cooling air is recycled for combustion, the energy deficit incurred must be made up with auxiliary fuel.

In the process of this invention, when DTO is wet-scrubbed so that the wet-scrubbed effluent is at a temperature lower than about 90° F., and preferably lower than 70° F., the odorous components of the gas are not substantially decreased, but the corrosive components are removed, thereby allowing the wet-scrubbed DTO to be passed through mild steel or cast iron ducts. Moreover, the moisture content at below 70° F. is relatively much lower than that at above 100° F., which is the normal temperature of DTO issuing directly from the decant tank, whether the DTO is diluted or not.

When DTO must be introduced into the furnace to deodorize it, the proces of this invention uses typically 10–40% less fuel than a comparable furnace with the same sludge load, using fresh air as shaft-cooling air, and then discharging the heated shaft-cooling air to the atmosphere, while using DTO as sludge combustion air.

EXAMPLE OF PRIOR ART PROCESS

In a specific example, dewatered sludge to be burned contains 25% total solids of which 70% are combustibles, and has a heating value of about 10,000BTU/lb of combustibles. Thus, there is 0.175 lb of combustibles per lb of wet sludge. The volume of DTO available is 8687 SCFM (standard cubic feet per minute). The DTO is not wet-scrubbed and is saturated at a temperature of 120° F. When 10 tons/hr of wet sludge are burned with 75% excess oxygen (above stoichiometric) 8687 SCFM of combustion air are required. All the DTO is used as sludge combustion air. In this specific case, it so happens that the shaft cooling air required is also 8687 SCFM. This shaft cooling air is heated to 450° F. and discharged to the atmosphere. The stack gas from the furnace is at 1400° F.

EXAMPLE OF THE PROCESS OF THE INVENTION

In a specific example, the same quantity of the same type of dewatered sludge as in the foregoing example is to be burned. The volume of DTO available is again 8687 SCFM at 120° F., all of which is now wet-scrubbed to lower its temperature from 120° F. to 70° F., and all this cooled wet-scrubbed DTO is used for shaft cooling before it is recycled for combustion to the combustion zone of the multiple hearth furnace. The temperature of the shaft-heated DTO is 450° F. The temperature of the stack gas is 1400° F. The result is a saving of 37% in auxiliary fuel attributable to the process of this invention.

What is claimed is:

1. In a waste disposal process, including settling suspended solids from sludge which has been conditioned to make it dewaterable, optionally thermally conditioning said sludge to aid dewatering thereof, removing a malodorous off-gas evolved from said sludge during treatment thereof, dewatering said sludge, and incinerating the dewatered sludge in a multiple hearth furnace provided with a rotatable central shaft and rabbling arms connected for rotation therewith, which arms are internally in open flow communication with said central shaft through which shaft-cooling gas is flowed, the improvement comprising,
    (a) wet-scrubbing said malodorous off-gas having a heating value less than about 100 BTU/ft$^3$, so as to provide a wet-scrubbed stream at a temperature within the range from about 32° F. to about 90° F.;
    (b) passing said wet-scrubbed stream, in a major proportion by volume of said shaft-cooling gas, through said central shaft so as to provide shaft-heated gas at a temperature above 212° F. but below about 600° F.; and,
    (c) ducting said shaft-heated gas into said furnace's combustion zone to provide pre-heated gas to assist in incineration of said sludge, said simultaneously to assist in deodorization of said shaft-heated gas.

2. The process of claim 1 wherein said dewatered sludge is sewage sludge having a solid content in the range from about 15% to about 60% by weight, combustible material in the range from about 40% to about 85%, and a heating value in excess of 7500 BTU/lb combustible material.

3. The process of claim 1 wherein said wet-scrubbed stream is at a temperature in the range from about 50° F. to about 80° F.

4. The process of claim 2 wherein said malodorous off-gas is decant tank off-gas, optionally diluted with air in an amount from about 0.5 to about 4.0 times the amount of said decant tank off-gas.

5. The process of claim 3 wherein substantially all said shaft-cooling gas is provided by said decant tank off-gas.

6. The process of claim 3 wherein the concentration of components of said wet-scrubbed gas corrosive to mold steel, is sufficiently low to permit the use of mild steel and cast iron to duct said wet-scrubbed decant tank off-gas.

7. The process of claim 3 wherein the concentration of methane in said decant tank off-gas is less than 3000 ppm.

8. The process of claim 3 wherein said shaft-heated gas is ducted at a temperature in the range from about 250° F. to about 450° F. to said furnace for combustion therein.

* * * * *

UNITED STATES PATENT AND TRADEMARK OFFICE
CERTIFICATE OF CORRECTION

PATENT NO. : 4,411,203
DATED : October 25, 1983
INVENTOR(S) : Frederick M. Lewis It is certified that error appears in the above-identified patent and that said Letters Patent is hereby corrected as shown below:

Cover page, line 20 of Abstract, "greater opening" should read --greater operating--.

Column 1, line 52, "wast" should read --waste--.

Column 3, line 35, "is a" should read --in a--.

Column 5, line 30, "Getchel" should read --Gitchel--.

Column 6, line 45, "quiet" should read --quite--; "not" should read --net--.

Column 8, line 54, "bles." should read --bles, preferably from about 7500 to about 15,000 BTU/lb combustibles.--.

Column 9, line 8, insert "is" before --highly--.

Column 10, line 29, Claim 1, "said" (second occurrence) should read --and--; line 49, Claim 6, "mold" should read --mild--.

Signed and Sealed this

Fourteenth Day of February 1984

[SEAL]

Attest:

GERALD J. MOSSINGHOFF

Attesting Officer　　Commissioner of Patents and Trademarks